UNITED STATES PATENT OFFICE.

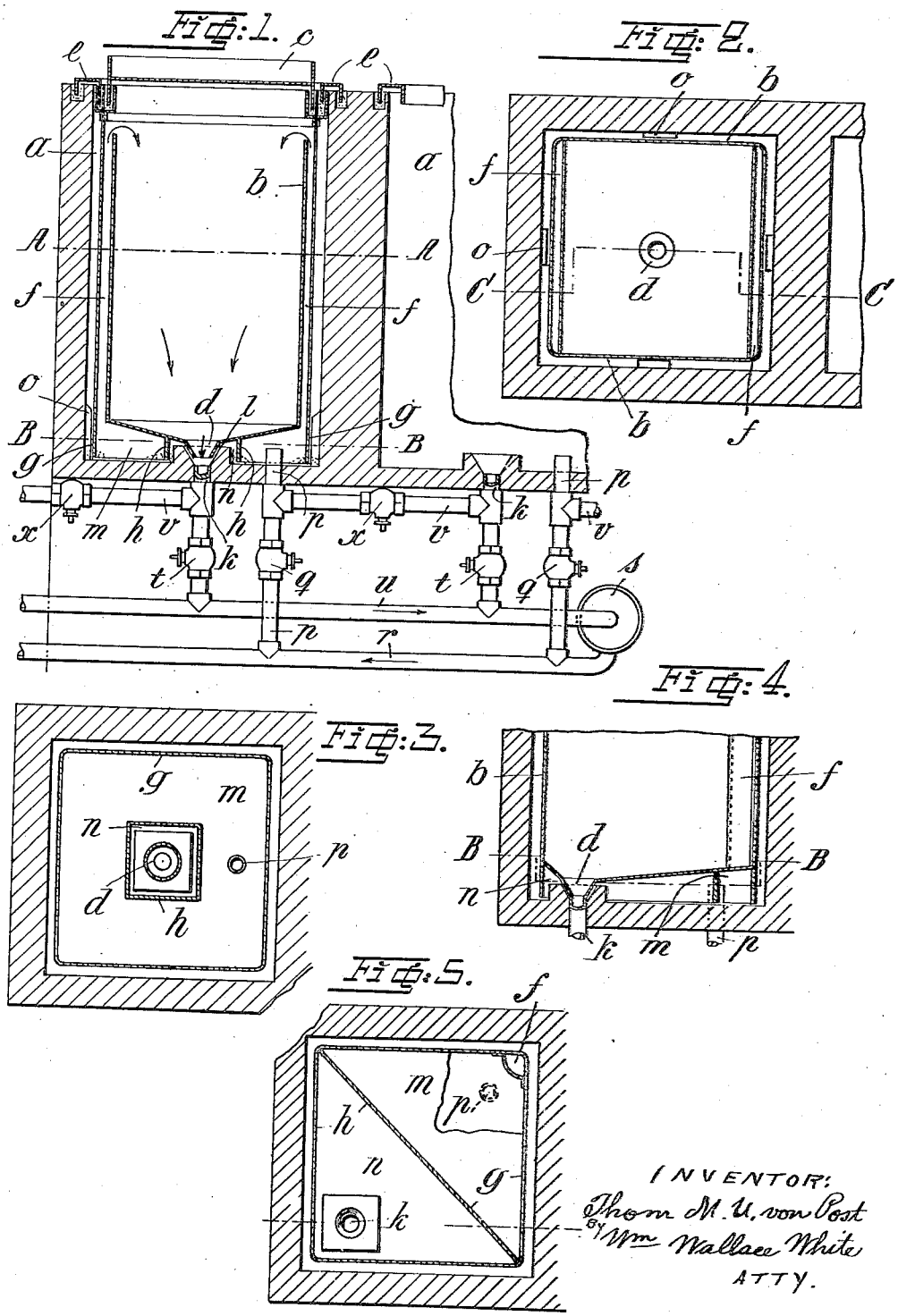

THOM MELCHER UNGERN von POST, OF STÄKET, SWEDEN.

FURNACE SYSTEM FOR DRY DISTILLATION.

1,375,943.

Specification of Letters Patent.　Patented Apr. 26, 1921.

Application filed October 16, 1919. Serial No. 331,214.

*To all whom it may concern:*

Be it known that I, THOM MELCHER UNGERN VON POST, a subject of the King of Sweden, residing at Stäket, Sweden, have invented certain new and useful Improvements in Furnace Systems for Dry Distillation, of which the following is a specification.

The present invention relates to a furnace or furnace system for dry distillation of materials and similar purposes with retorts or closed chambers for the indirect heating of the material to be treated, in which gases can be led through the retorts, thereby effecting a more rapid supply and a more uniform distribution of heat and an easier regulation of the temperature conditions in the retorts whereby a higher output of cooked, charged or dry distillation products is obtained.

Figure 1 on the accompanying drawing shows diagrammatically a form of the furnace system according to the present invention in vertical section on the line C—C in Fig. 2.

Fig. 2 is a horizontal section on the line A—A in Fig. 1.

Fig. 3 is a horizontal section on the line B—B in Fig. 1.

Fig. 4 shows a partial vertical section of another form of the chamber with its retort.

Fig. 5 is a horizontal section on the line B—B in Fig. 4.

The furnace or kiln consists of one or more heating chambers or shafts $a$ containing removable retorts $b$. The chamber $a$ may be arranged in series, so that heated air and fire gases from the hearth can be led from chamber to chamber through the entire series cooling, heating and pre-heating the retorts for example in the manner stated in my U. S. A. Patent Number 889150 of May 26th, 1908.

Each retort $b$ is provided with a lid or cover $c$, which can be shut gas-tight in the usual manner and provided with upstanding edges, intended to keep in place a layer of sand placed on it for heat-insulating purposes, and with an outlet $d$ at the bottom of the retort for the escape of gas previously introduced into the retort and of distillation and reaction products.

The packing on the upper edges of the retort and of the chamber is effected for example, by means of sand and of loose shields or guards $e$ for the combustion gases circulating in the shaft around the retort, or for the air intended for heating or cooling of the contents of the retorts after the cooking or charring. In the retort there are also arranged one or more conduits $f$. These conduits may consist, for example, of spaces formed by providing a double wall $g$ at one or more sides of the retort, as shown in Figs. 1 and 2, and which conduits communicate at the top with the retort, the walls $g$ extending downward below the bottom of the retort. The outlet $d$ of the retort is surrounded by a jacket $h$ formed on the bottom of the retort. It will thus be seen that, as shown in Figs. 1 and 2, the walls or jacket $g$ inclose the jacket $h$ between them. As shown in Figs. 4 and 5, the conduit $f$ and outlet $d$ are arranged diagonally opposite to each other in the bottom of the retort, and the jackets $g$ and $h$ are formed partly by prolongations of the retort walls, and partly by a screen running diagonally between the conduit $f$ and outlet $d$ and forming a common wall for the two jacket spaces $m$ and $n$.

In the bottom of the furnace shaft there is an outlet opening $k$, intended to communicate with the outlet $d$ of the retort, the bottom being provided with an extension $l$ having a conical opening communicating with the opening $k$ and adapted to form a seat for the correspondingly formed lower portion of the retort outlet $d$. In the annular bottom chamber formed by the mouth $l$ and the wall of the shaft, is charged sand or the like, so that on the lowering of the retort into the chamber there is produced a gastight damper whereby the jackets $g$ and $h$ and the bottoms of the retort and of the chamber form two inclosed spaces $m$ and $n$, the former communicating with conduits $f$ and the latter surrounding the outlet $d$ and the mouth $l$ of the discharge pipe $k$. In Figs. 1 and 3 the jacket space $m$ surrounds the jacket space $n$; in Figs. 4 and 5 the two spaces lie adjacent to one another.

Owing to the fact that the mouth $l$ of the conduit $k$ extends above the bottom and is conically expanded and that the outlet $d$ has been given a corresponding shape, sand is prevented from entering into the conduit $k$, or volatile distillation products into the sand seal or packing or the bottom chamber, and a securer centering or guiding of the retort during its lowering is effected. In order to still further secure this guiding, the walls of the chamber may be provided with projections *o* or the like as shown in Fig. 2, and which projections are preferably beveled at the top, thus forming sliding or guiding surfaces for the lower edges of the retort. It will, of course, be obvious that these projections could be formed on the outer sides of the walls of the retort instead of on the inner sides of the chamber walls.

Through the bottom of the furnace chamber passes a pipe *p*, the mouth of which extends up over the sand seal into the jacket space *m*. This pipe is in closable communication with a main pipe *r* common to all the chambers, in case more than one exists and which proceeds from a condenser *s*. The discharge pipe *k* is likewise, by means of a damper device, in closable communication with a main pipe *u*, which latter may be common to the entire furnace system, leading to the condenser *s*, the pipe *u* being also in communication with the condenser *s*. The pipe *k* may, if desired, be provided with a branch pipe having a liquid seal for the automatic escape of volatile products of distillation, and at the same time serving as a safety valve in case too great pressure should arise in the retort. The pipe *u* or *r* may be placed in communication with a blower or other suitable device for forcing the gas current through the piping and the retorts. Moreover a gas reservoir or tank should be arranged in the pipe *r* for the purpose of collecting and distributing the combustible uncondensed gases generated during the dry distillation.

When the furnace is arranged with several furnace chambers in series, it is advisable to connect the outlet of one retort with the inlet of the next retort, whence the discharge pipe *k* in one furnace chamber is in closable communication with the inlet pipe *p* of the immediately succeeding chamber through the pipe *v*, provided with a valve or damper *x*.

The furnace system operates in the following manner:

When the retort has been lowered into its place in the chamber and filled with the material to be cooked, hot gases from a hearth or fire chamber, not shown in the drawing, are admitted through the pipe *r* around the retort, the valves *q* and *t* are opened and the valves *x* on either side of the retort are kept closed. In this way gas flows in from the main pipe *r*, either with the aid of a fan or blower as above mentioned or owing to natural circulation arising from the heating of the walls, through the inlet pipe *p*, the jacket space *m*, the conduit or conduits *f*, absorbing heat from the hot gases through the retort walls, sweeps downward through the retort charge, giving off in its progress the heat previously absorbed and carrying with it the products of distillation, then passes through the retort outlet *d*, the pipe *k* and the main pipe *u* to the condenser *s*, in order there to give off condensable products, and again to complete a new circuit until the material in the retort has been completely treated, when the retort is cut out and a new one inserted, whereupon the valves *q* and *t* are closed so that gas cannot enter into the chamber from the pipes *p* and *k*.

Several retorts in the same furnace system can in this way be simultaneously brought into the gas circulation. It should be noted, that the gas, before its admission into a retort, must first pass the condenser in order to give off condensable products and there to be cooled, in order again to be heated and so on. This entails appreciable losses of heat, which nevertheless can be avoided either by forming the condenser into a distillation apparatus for volatile distillation products, which are to be redistilled or concentrated, for example woodspirit, or, as is preferable, by diverting the gases from one retort direct to an adjacent retort, through the pipe *v* and thus successively until sufficient heat has been given off, in order finally through the main pipe *u* to be led to the condenser *s* for the separation of the remaining products of distillation.

The above described furnace system is also usable for other purposes than dry distillation. Thus it permits of being employed to advantage anywhere, where it may be desired to heat in closed spaces material which will not stand the access of air, in which case the gases forced through the material may be indifferent to the material to be treated, or also of such a nature that it acts upon it in a certain desired direction.

Having thus described my invention, I declare, that what I claim is:

1. In a furnace system for dry distillation, a closed chamber, a retort removably located in said chamber and provided with a conduit communicating with an inlet at the bottom of said chamber and adapted for leading gases from said inlet into the retort at the top of the same, the retort being also at its bottom provided with an outlet, communicating with an outlet pipe opening into the bottom of said chamber, means at the bottom of the chamber by which the outlet and the inlet at the bottom of said chamber are gas-tightly separated from each other, and a condenser communicating with said inlet and outlet.

2. In a furnace system for dry distillation, a closed chamber, a retort removably located in said chamber and provided with a conduit communicating with an inlet at the bottom of said chamber and adapted for leading gases from said inlet into the retort at the top of the same, the retort being also at its bottom provided with an outlet communicating with an outlet pipe opening into the bottom of said chamber, flanges fastened to the bottom of the retort and entering into a sand seal at the bottom of the chamber, which flanges together with the outer walls of the retort which also project into the sand seal, divide the bottom space of the chamber into two parts gastightly separated from each other, one part communicating with the said inlet and the other part with the said outlet, and a condenser communicating with said inlet and said outlet.

3. In a furnace system for dry distillation, a closed chamber, a retort removably located in said chamber and provided with a conduit communicating with an inlet at the bottom of said chamber and adapted for leading gases from said inlet into the retort at the top of the same, the retort being also at its bottom provided with an outlet communicating with an outlet pipe, opening into the bottom of said chamber, means at the bottom of the chamber by which the outlet and the inlet at the bottom of said chamber are gastightly separated from each other, and a condenser communicating with said inlet and outlet by means of pipes provided with means for closing or opening said communication.

4. In a furnace system for dry distillation, a closed chamber, a retort removably located in said chamber and provided with a conduit communicating with an inlet at the bottom of said chamber and adapted for leading gases from said inlet into the retort at the top of the same, the retort being also at its bottom provided with an outlet communicating with an outlet pipe opening into the bottom of said chamber, means at the bottom of the chamber by which the outlet and the inlet at the bottom of said chamber are gastightly separated from each other, a condenser communicating with said inlet and outlet, and means for spacing the outer walls of the retort from the inner walls of said chamber.

5. In a furnace system for dry distillation, a closed chamber, a retort removably located in said chamber and provided with conduits communicating with an inlet at the bottom of said chamber and adapted for leading gases from said inlet into the retort at the top of the same, the retort being also at its bottom provided with an outlet communicating with an outlet pipe opening into the bottom of said chamber, means at the bottom of the chamber by which the outlet and the inlet at the bottom of said chamber are gastightly separated from each other, and a condenser communicating with said inlet and outlet, the conduits for leading gases from the inlet into the retort being formed by the spaces between an outer and inner wall of the retort.

6. In a furnace system for dry distillation, a closed chamber, a retort removably located in said chamber and provided with conduits communicating with an inlet at the bottom of said chamber and adapted for leading gases from said inlet into the retort at the top of the same, the retort being also at its bottom provided with an outlet communicating with an outlet pipe opening into the bottom of said chamber, means at the bottom of the chamber by which the outlet and the inlet at the bottom of said chamber are gastightly separated from each other, and a condenser communicating with said inlet and outlet, said means for gastightly separating the inlet and outlet openings from each other consisting of a diagonally arranged flange fastened to the bottom of the retort and together with downwardly prolonged sidewalls of the retort entering in a sand seal located at the bottom of the chamber thereby dividing the space at the bottom of the chamber into two spaces, one communicating with the inlet and the other with the outlet opening.

7. In a furnace, a plurality of closed chambers, a retort removably located in each of said chambers and provided with conduits communicating with an inlet and adapted for leading gases from said inlet into the retort at the top of the same, the retort being also at its bottom provided with an outlet communicating with an outlet pipe opening into the bottom of said chamber, means at the bottom of the chamber by which the outlet and the inlet at the bottom of said chamber are gastightly separated from each other, and a condenser communicating with said inlet and outlet, the outlet of the one chamber communicating by closable pipes with the inlet of the next chamber in the series, in such a way that gaseous products from the one retort may by said pipe be introduced into another retort in the series.

In witness whereof I have hereunto set my hand in presence of two witnesses.

THOM MELCHER UNGERN von POST.

Witnesses:
    AUG. HAGELIN,
    PER JOHANSSON.